United States Patent
Fagan et al.

(10) Patent No.: US 11,655,178 B2
(45) Date of Patent: May 23, 2023

(54) METHODS AND APPARATUS FOR MANUFACTURING A GLASS-BASED ARTICLE

(71) Applicant: CORNING INCORPORATED, Corning, NY (US)

(72) Inventors: Sumalee Likitvanichkul Fagan, Painted Post, NY (US); Jason Thomas Harris, Horseheads, NY (US); Jean Philippe Michel Peraud, Seattle, WA (US); Rohit Rai, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 249 days.

(21) Appl. No.: 16/913,709

(22) Filed: Jun. 26, 2020

(65) Prior Publication Data

US 2020/0407260 A1     Dec. 31, 2020

Related U.S. Application Data

(60) Provisional application No. 62/868,244, filed on Jun. 28, 2019.

(51) Int. Cl.
| | | |
|---|---|---|
| *C03C 21/00* | (2006.01) | |
| *C03C 15/00* | (2006.01) | |
| *C03B 23/023* | (2006.01) | |

(52) U.S. Cl.
CPC ............ *C03B 23/023* (2013.01); *C03C 15/00* (2013.01); *C03C 21/002* (2013.01); *C03C 2218/33* (2013.01)

(58) Field of Classification Search
None
See application file for complete search history.

(56) References Cited

U.S. PATENT DOCUMENTS

| | | |
|---|---|---|
| 5,654,057 A | 8/1997 | Kitayama et al. |
| 8,889,254 B2 | 11/2014 | Bayne et al. |
| 9,292,634 B2 | 3/2016 | Ahmed et al. |

(Continued)

FOREIGN PATENT DOCUMENTS

| | | |
|---|---|---|
| CN | 202784250 U | 3/2013 |
| CN | 105358500 A | 2/2016 |

(Continued)

OTHER PUBLICATIONS

International Search Report and Written Opinion of the International Searching Authority; PCT/US2020/039721; dated Oct. 19, 2020; 10 Pages; European Patent Office.

(Continued)

*Primary Examiner* — David Sample
(74) *Attorney, Agent, or Firm* — Jeffrey A. Schmidt

(57) ABSTRACT

A glass-based article includes a first major surface and a first compressive stress region extending to a first depth of compression from the first major surface. The glass-based article includes a second major surface including a first surface portion and one or more edge surface portions recessed from the first surface portion. The glass-based article includes a second compressive stress region extending to a second depth of compression from the first surface portion. Additionally, methods of manufacturing a glass-based article are disclosed.

9 Claims, 6 Drawing Sheets

(56) References Cited

U.S. PATENT DOCUMENTS

| | | | |
|---|---|---|---|
| 9,656,910 B2 | 5/2017 | Bazemore et al. | |
| 9,663,396 B2 | 5/2017 | Miyasaka et al. | |
| 9,779,190 B2 | 10/2017 | Ahmed et al. | |
| 9,796,621 B2 | 10/2017 | Varshneya et al. | |
| 9,840,436 B2 | 12/2017 | Clippinger | |
| 10,155,689 B2 | 12/2018 | Gross | |
| 10,183,887 B2 | 1/2019 | Comte et al. | |
| 10,185,113 B2 | 1/2019 | Prest et al. | |
| 2011/0187245 A1 | 8/2011 | Pakula et al. | |
| 2012/0236526 A1* | 9/2012 | Weber | C03C 21/002 65/30.14 |
| 2013/0125588 A1 | 5/2013 | Kladias et al. | |
| 2014/0078412 A1* | 3/2014 | Franklin | C03C 17/002 349/12 |
| 2014/0234581 A1 | 8/2014 | Immerman et al. | |
| 2014/0331716 A1 | 11/2014 | Ahmed et al. | |
| 2014/0335322 A1 | 11/2014 | Luo et al. | |
| 2016/0162615 A1 | 6/2016 | Ahmed et al. | |
| 2017/0334770 A1* | 11/2017 | Luzzato | C03C 21/005 |

FOREIGN PATENT DOCUMENTS

| | | | |
|---|---|---|---|
| DE | 112010005568 T5 | 4/2013 | |
| EP | 2466427 A2 * | 6/2012 | ............ B24B 1/00 |
| EP | 2994436 A1 | 3/2016 | |
| KR | 10-2013-0087558 A | 8/2013 | |
| KR | 10-1931322 B1 | 12/2018 | |
| KR | 10-2019-0018114 A | 2/2019 | |
| TW | 201502015 A | 1/2015 | |
| WO | 2014/059411 A1 | 4/2014 | |
| WO | WO-2014050798 A1 * | 4/2014 | ............ B32B 17/06 |
| WO | 2014/130515 A1 | 8/2014 | |
| WO | 2014/182641 A1 | 11/2014 | |
| WO | 2018/008359 A1 | 1/2018 | |
| WO | 2018/152021 A1 | 8/2018 | |
| WO | 2020/106472 A1 | 5/2020 | |

OTHER PUBLICATIONS

Valashani et al., "A Laser-Engraved Glass Duplicating the Structure, Mechanics and Performance of Natural Nacre", Bioinspir, Biomim. 10, 2015, pp. 1-11.

* cited by examiner

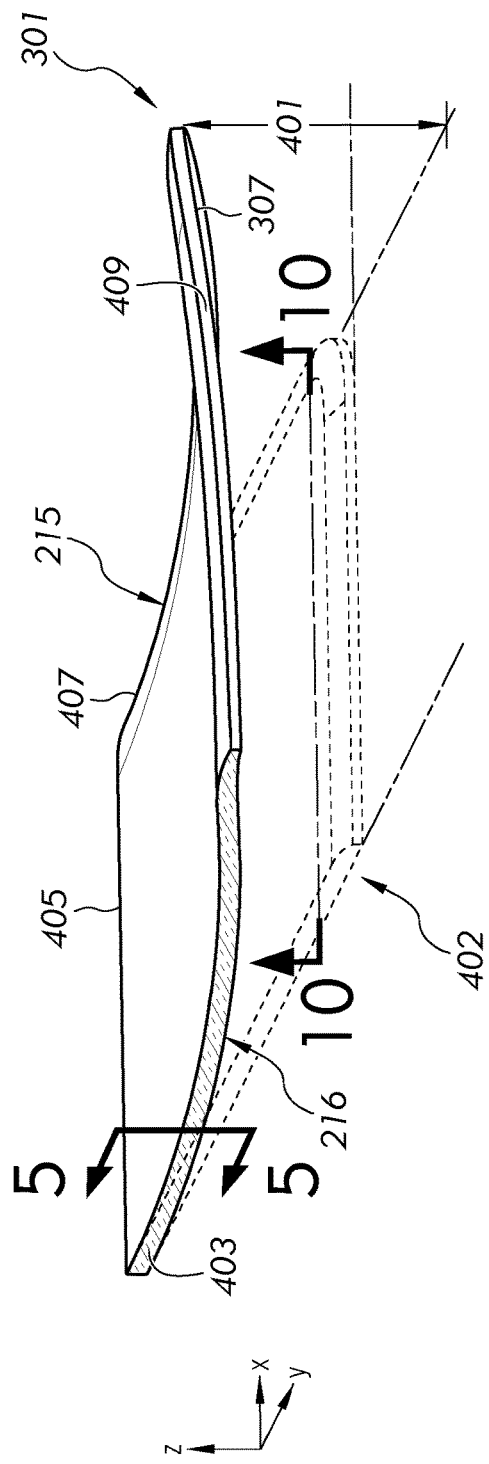
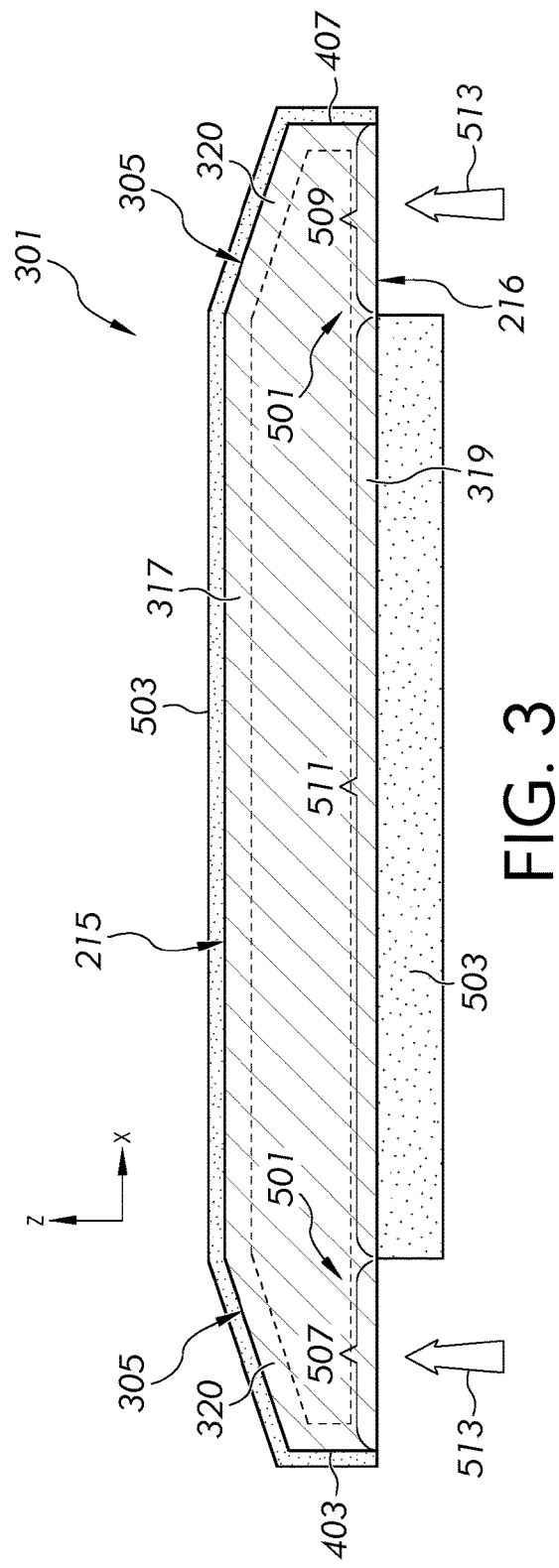

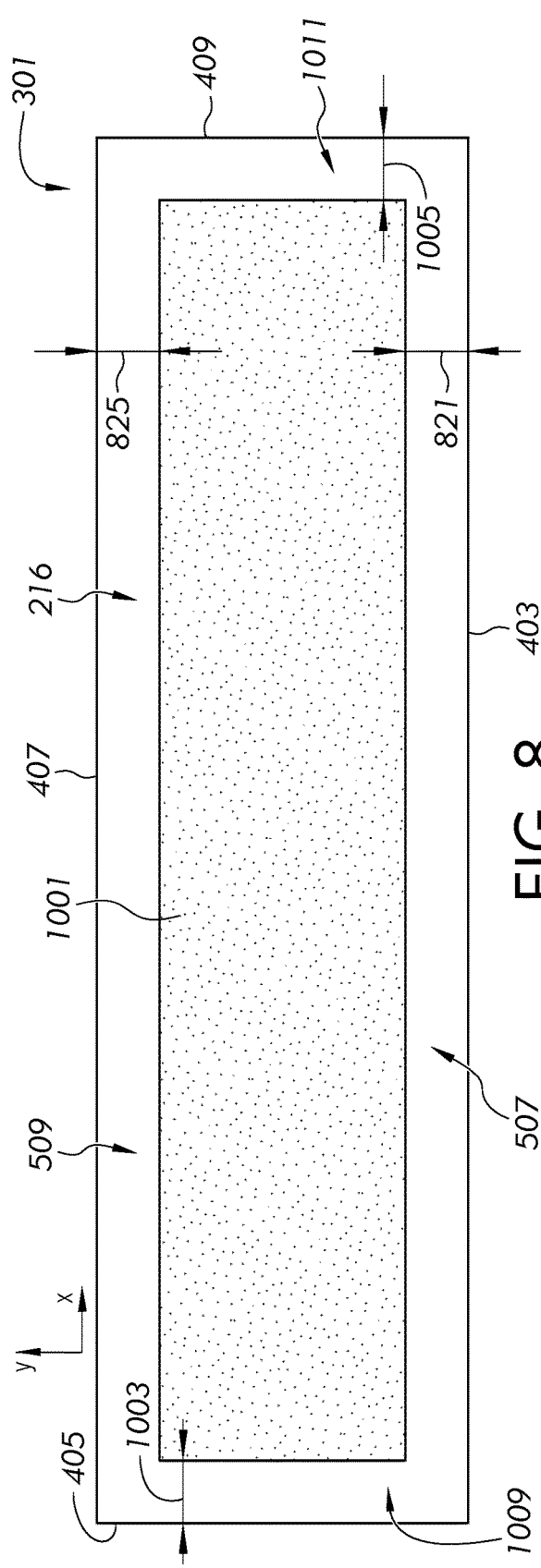
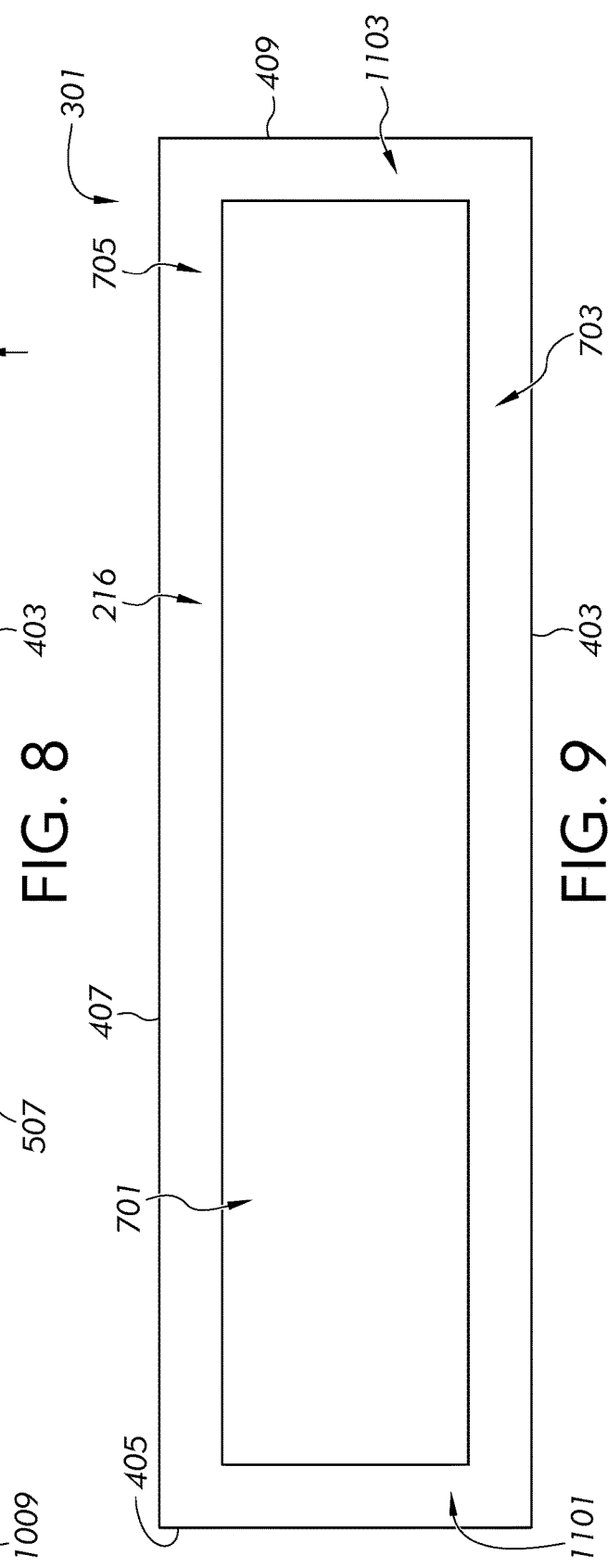
FIG. 8
FIG. 9

METHODS AND APPARATUS FOR MANUFACTURING A GLASS-BASED ARTICLE

CROSS-REFERENCE TO RELATED APPLICATION

This application claims the benefit of priority under 35 U.S.C. § 119 of U.S. Provisional Application Ser. No. 62/868,244 filed on Jun. 28, 2019, the content of which is relied upon and incorporated herein by reference in its entirety.

FIELD

The present disclosure relates generally to methods for manufacturing a glass-based article and, more particularly, to methods for manufacturing a glass-based article with a recessed edge surface portion.

BACKGROUND

Glass-based articles can be used in consumer electronic products. A glass-based article can be formed with a beveled edge shape, in which one major surface of the glass-based article comprises a larger surface area than an opposing major surface. However, due to this asymmetry between the major surfaces, forming compressive stress regions within these glass-based articles can generate a bending moment, which can lead to unwanted deformation of the glass-based article. In some cases, the deformation can exceed the thickness of the glass-based article and can cause the glass-based article to no longer comprise a planar shape.

SUMMARY

There are set forth methods of manufacturing a glass-based article, comprising forming a first compressive stress region at a first major surface of the glass-based article, and a second compressive stress region at a second major surface of the glass-based article. The second major surface may initially comprise a larger surface area than the first major surface, which can produce a bending moment within the glass-based article after the compressive stress regions are formed. Methods comprise reducing the bending moment of the glass-based article by removing one or more edge portions of the second major surface. By removing the one or more edge portions of the second major surface, asymmetrical stresses generated between the first major surface and the second major surface can be equalized. As a result, the bending moment can be reduced or neutralized, and unwanted warp or deformation of the glass-based article can be avoided.

Embodiment 1. A glass-based article comprises a first major surface, a first compressive stress region extending to a first depth of compression from the first major surface, and a second major surface comprising a first surface portion and one or more edge surface portions recessed from the first surface portion. The glass-based article comprises a second compressive stress region extending to a second depth of compression from the first surface portion.

Embodiment 2. The glass-based article of embodiment 1, wherein the one or more edge surface portions comprise a first edge surface portion recessed from the first surface portion and a second edge surface portion recessed from the first surface portion, the first edge surface portion extending along a first side of the first surface portion, the second edge surface portion extending along a second side of the first surface portion.

Embodiment 3. The glass-based article of embodiment 2, wherein the one or more edge surface portions comprise a third edge surface portion recessed from the first surface portion and a fourth edge surface portion recessed from the first surface portion, the third edge surface portion extending along a third side of the first surface portion, the fourth edge surface portion extending along a fourth side of the first surface portion.

Embodiment 4. The glass-based article of any one of embodiments 1-3, wherein the first major surface extends within a first plane.

Embodiment 5. The glass-based article of embodiment 4, wherein the first surface portion extends within a second plane that is substantially parallel to the first plane.

Embodiment 6. The glass-based article of embodiment 5, wherein the one or more edge surface portions extend within a third plane that is substantially parallel to the second plane and positioned between the first plane and the second plane.

Embodiment 7. The glass-based article of embodiment 5, wherein the one or more edge surface portions are angled relative to the first plane and the second plane, the one or more edge surface portions extending from the first surface portion to an edge of the glass-based article.

Embodiment 8. The glass-based article of embodiment 1, further comprising a beveled edge surface extending from the first major surface to an edge of the glass-based article.

Embodiment 9. A consumer electronic product comprises a housing comprising a front surface, a back surface, and side surfaces. The consumer electronic product comprises one or more electrical components within the housing, the electrical components comprising a controller, a memory, and a display, wherein the display is at or adjacent to the front surface of the housing. The consumer electronic product comprises a cover substrate disposed over the display, wherein at least a portion of the housing or the cover substrate comprises the glass-based article of any of embodiments 1-8.

Embodiment 10. A glass-based article comprises a first major surface comprising a first length and a first width perpendicular to the first length. The glass-based article comprises a first compressive stress region extending to a first depth of compression from the first major surface. The glass-based article comprises a second major surface parallel to the first major surface. The second major surface comprises a second length greater than the first length, and a second width, perpendicular to the second length, greater than the first width. The second major surface comprises a first surface portion, a first edge surface portion recessed from the first surface portion, and a second edge surface portion recessed from the first surface portion. The first edge surface portion extends along the second length on a first side of the first surface portion. The second edge surface portion extends along the second length on a second side of the first surface portion. The glass-based article comprises a second compressive stress region extending to a second depth of compression from the first surface portion.

Embodiment 11. The glass-based article of embodiment 10, wherein the one or more edge surface portions comprise a third edge surface portion recessed from the first surface portion and a fourth edge surface portion recessed from the first surface portion, the third edge surface portion extending along the second width on a third side of the first surface portion, the fourth edge surface portion extending along the second width on a fourth side of the first surface portion.

Embodiment 12. The glass-based article of any one of embodiments 10-11, wherein the first major surface extends within a first plane and the first surface portion extends within a second plane.

Embodiment 13. The glass-based article of embodiment 12, wherein the first edge surface portion extends within a third plane that is substantially parallel to the second plane and positioned between the first plane and the second plane.

Embodiment 14. The glass-based article of embodiment 13, wherein the second edge surface portion extends within the third plane.

Embodiment 15. The glass-based article of embodiment 12, wherein the first edge surface portion is angled relative to the first plane and the second plane, the first edge surface portion extending from the first surface portion to an edge of the glass-based article.

Embodiment 16. The glass-based article of embodiment 10, wherein an intersection between the first surface portion and one or more of the first edge surface portion or the second edge surface portion is rounded.

Embodiment 17. A method of manufacturing a glass-based article comprises forming a first compressive stress region at a first major surface of the glass-based article, and a second compressive stress region at a second major surface of the glass-based article. Methods comprise reducing a bending moment of the glass-based article by removing one or more edge portions of the second major surface.

Embodiment 18. The method of embodiment 17, wherein the reducing the bending moment comprises forming a first edge surface portion that is recessed from a first surface portion of the second major surface.

Embodiment 19. The method of embodiment 17, wherein the reducing the bending moment comprises removing the one or more edge portions of the second major surface about a perimeter of the glass-based article.

Embodiment 20. The method of any one of embodiments 17-19, wherein the reducing the bending moment comprises etching the second major surface to remove the one or more edge portions.

Embodiment 21. The method of any one of embodiments 17-20, wherein the reducing the bending moment comprises grinding the second major surface to remove the one or more edge portions.

Embodiment 22. The method of any one of embodiments 17-21, wherein the reducing the bending moment comprises neutralizing the bending moment.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which:

FIG. 2 illustrates a perspective view of example embodiments of a glass-based article after the formation of a compressive stress region in accordance with embodiments of the disclosure;

FIG. 3 illustrates a sectional view of example embodiments of the glass-based article along line 5-5 of FIG. 2 in accordance with embodiments of the disclosure;

FIG. 8 illustrates a bottom view of example embodiments of the glass-based article along line 10-10 of FIG. 2 in accordance with embodiments of the disclosure;

FIG. 9 illustrates a bottom view of example embodiments of the glass-based article following the removal of one or more edge portions in accordance with embodiments of the disclosure;

DETAILED DESCRIPTION

Figure 1:
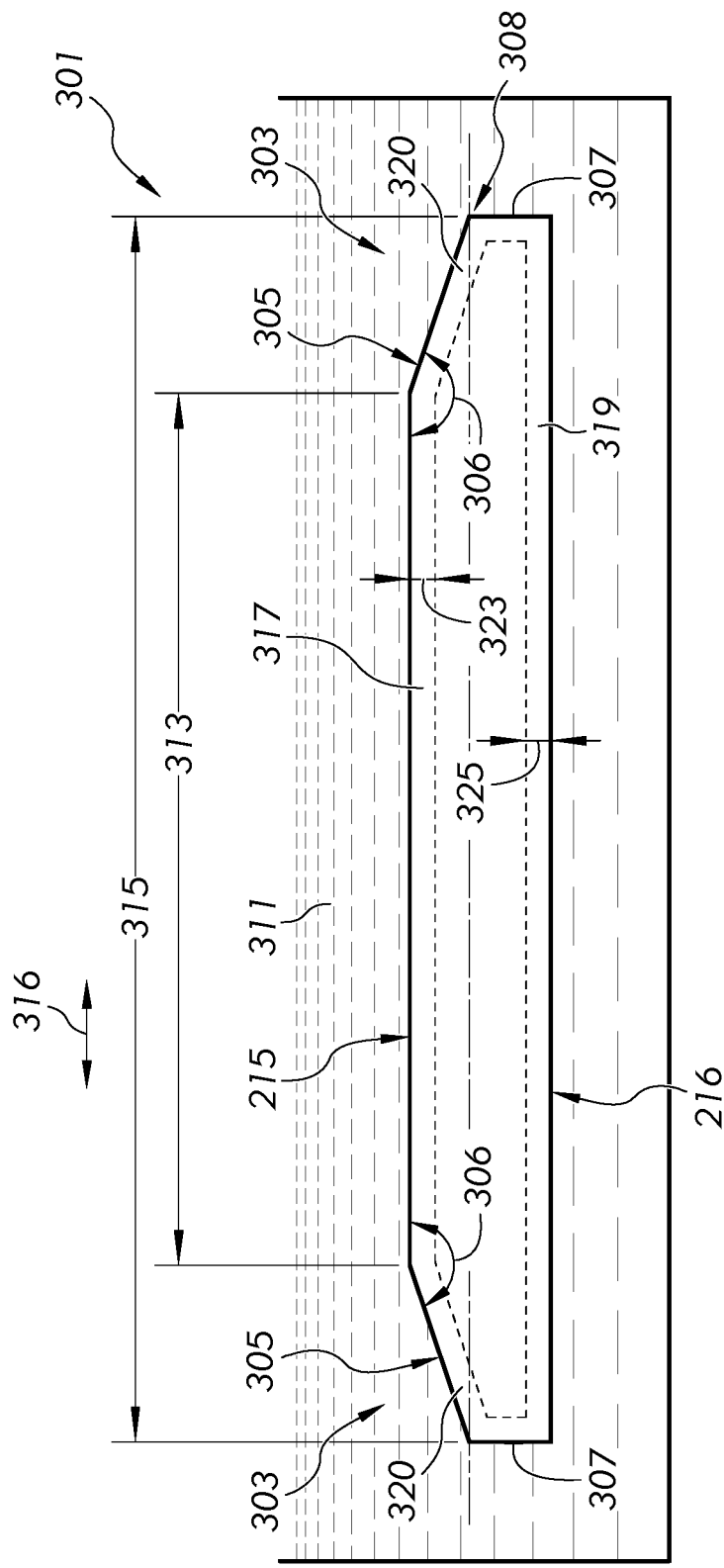
FIG. 1 illustrates a side view of example embodiments of a glass-based article exposed to a strengthening bath in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to a glass-based article manufacturing apparatus and methods for manufacturing a glass-based article. Methods and apparatus for manufacturing a glass-based article will now be described by way of example embodiments for manufacturing a glass-based article. A glass-based article may be formed into a sheet-shape from a quantity of molten material by a number of different forming methods, for example, down draw, slot draw, fusion draw, up draw, float, and/or rolling processes as known in the art.

The sheet-shaped glass-based article can then be processed into a desired application, e.g., a display application. For example, the sheet-shaped glass-based article can be used in a wide range of display applications, including liquid crystal displays (LCDs), electrophoretic displays (EPD), organic light emitting diode displays (OLEDs), plasma display panels (PDPs), touch sensors, photovoltaics, and other electronic displays.

Referring to FIG. 1, a side view of a glass-based article 301 is illustrated. In some embodiments, the glass-based article 301 can comprise the sheet-shaped glass-based article formed from any one or more of the above-noted processes. As used herein the term "glass-based" is meant to comprise any material made at least partially of glass, including glass, and glass-ceramics. "Glass-ceramics" may comprise materials produced through controlled crystallization of glass. In some embodiments, glass-ceramics may comprise a range from about 1% to about 99% crystallinity. In some embodiments, suitable glass-ceramics may comprise $Li_2O$—$Al_2O_3$—$SiO_2$ system (e.g., LAS-System) glass-ceramics, MgO—$Al_2O_3$—$SiO_2$ system (e.g., MAS-System) glass-ceramics, $ZnO\times Al_2O_3\times nSiO_2$ (e.g., ZAS system), and/or glass-ceramics that comprise a predominant crystal phase including β-quartz solid solution, β-spodumene, cordierite, and lithium disilicate. The glass-ceramic substrates may be strengthened using a chemical strengthening processes disclosed herein. In some embodiments, MAS-System glass-ceramic substrates may be strengthened in $Li_2SO_4$ molten salt, whereby an exchange of $2Li^+$ for $Mg^{2+}$ can occur.

In some embodiments, the glass-based article 301 can comprise the first major surface 215 and the second major surface 216. One or more of the first major surface 215 or the second major surface 216 may be planar. For example, the first major surface 215 and the second major surface 216 may be planar and parallel to one another. In some embodiments, the glass-based article 301 can comprise a beveled edge 303 that can extend about a perimeter of the glass-based article 301. For example, the beveled edge 303 of the glass-based article 301 can comprise a beveled edge surface 305 that extends from the first major surface 215 to an edge 307 of the glass-based article 301. In some embodiments, the edge 307 may comprise chamfers on one or more sides. Since FIG. 1 illustrates a side view of the glass-based article 301, an intersecting location 308 where the beveled edge surface 305 contacts and/or intersects the edge 307 is illustrated as a horizontal line. The beveled edge surface 305 can extend non-parallel to the first major surface 215 and the second major surface 216. For example, the beveled edge surface 305 can define an angle 306 relative to the first major surface 215 that may be within a range from greater than 90 degrees to less than 180 degrees. In some embodiments, the beveled edge surface 305 can comprise a substantially planar shape, though, in some embodiments, the beveled edge surface 305 may be non-planar. For example, the beveled edge surface 305 may comprise a curved shape (e.g., concave shape or convex shape). The beveled edge surface 305 can define a decreasing thickness of the glass-based article 301 from the first major surface 215 towards the edge 307. In some embodiments, the edge 307 may be planar, for example, and may extend substantially perpendicular to the first major surface 215 and the second major surface 216. The edge 307 is not so limited, however, and in some embodiments, the edge 307 can comprise a curved shape (e.g., concave shape or convex shape).

With the glass-based article 301 comprising the beveled edge 303, a dimension of the first major surface 215 may be different than a dimension of the second major surface 216. The first major surface 215 may comprise a first dimension 313 between opposed portions of the beveled edge surface 305, for example, between locations where the first major surface 215 contacts the opposed portions of the beveled edge surface 305. In some embodiments, the first dimension 313 can comprise a width or a length of the first major surface 215 of the glass-based article 301. The first dimension 313 can be measured along a direction 316 that may be parallel to the first major surface 215. In some embodiments, the second major surface 216 may comprise a second dimension 315 between opposed portions of the edge 307 of the glass-based article 301, for example, between locations where the second major surface 216 contacts the opposed portions of the edge 307. In some embodiments, the second dimension 315 can comprise a width or a length of the second major surface 216 of the glass-based article 301. The second dimension 315 can be measured along the direction 316 that may be parallel to the second major surface 216. In some embodiments, the second dimension 315 may be greater than the first dimension 313.

In some embodiments, methods of manufacturing the glass-based article 301 can comprise forming a first compressive stress region 317 at the first major surface 215 of the glass-based article 301, a second compressive stress region 319 at the second major surface 216 of the glass-based article 301, and a third compressive stress region 320 at the beveled edge surface 305 and, in some embodiments, also at an outer surface of the edge 307. For example, the glass-based article 301 can be chemically strengthened to produce the compressive stress regions. In some embodiments, the glass-based article 301 can be chemically strengthened, for example, by submerging the glass-based article 301 in a strengthening bath 311 to form the first compressive stress region 317, the second compressive stress region 319, and third compressive stress region 320. In some embodiments, exposing the glass-based article 301 to the strengthening bath 311 can form the first compressive stress region 317, the second compressive stress region 319, and the third compressive stress region 320 through an ion exchange process. For example, the first compressive stress region 317, the second compressive stress region 319, and third compressive stress region 320 can comprise a plurality of ion-exchangeable ions and a plurality of ion-exchanged ions. The ion-exchanged ions can be selected to produce a first compressive stress in the first compressive stress region 317, a second compressive stress in the second compressive stress region 319, and a third compressive stress in the third compressive stress region 320. In some embodiments, the ion-exchanged ions can have an atomic radius that can be larger than the atomic radius of the ion-exchangeable ions. For example, the ion-exchangeable ions (e.g., $Na^+$ ions) may be present in the glass-based article 301 prior to the glass-based article 301 being exposed to the strengthening bath 311 and, thus, an ion exchange process. Ion-exchanging ions (e.g., $K^+$ ions) may be incorporated into the glass-based article 301 to replace some of the ion-exchangeable ions.

The incorporation of the ion-exchanging ions (e.g., $K^+$ ions) into the first major surface 215, the second major surface 216, the beveled edge surface 305, and, in some embodiments, the outer surface of the edge 307 the glass-based article 301 may be produced by submerging the glass-based article 301 into the strengthening bath 311. In some embodiments, the strengthening bath 311 may comprise a molten salt bath containing ion-exchanging ions (e.g., molten $KNO_3$ salt). The ion-exchanging ions (e.g., $K^+$ ions) may have a larger atomic radius than the ion-exchangeable ions (e.g., $Na^+$ ions), which can generate compressive stresses within the glass-based article 301, for example, at the first compressive stress region 317, the second compressive stress region 319, and the third compressive stress region 320. In some embodiments, the glass-based article 301 can be exposed to the strengthening bath 311 from about 6 hours to about 8 hours, with the strengthening bath 311 maintained at a temperature from about 350° Celsius (° C.) to about 450° C., for example, or from 450° C. to 500° C., or from 500° C. to 525° C.

In some embodiments, a depth of compression of the first compressive stress region 317, the second compressive stress region 319, and the third compressive stress region 320 can comprise substantially the same compressive stress. For example, the first compressive stress region 317 can extend to a first depth of compression 323 from the first major surface 215, while the second compressive stress region 319 can extend to a second depth of compression 325 from a first surface portion of the second major surface 216. The depth of compression (DOC) is the depth at which the stress in the article changes from compressive to tensile. In some embodiments, the first depth of compression 323 may be equal to the second depth of compression 325. Depending on the amount of time the glass-based article 301 is exposed to the strengthening bath 311, the first depth of compression 323 of the first compressive stress region 317 and the second depth of compression 325 of the second compressive stress region 319 can be controlled. For example, when the glass-based article 301 is exposed to the strengthening bath 311 for a longer period of time (e.g., closer to 8 hours, for example), the first depth of compression 323 of the first compressive stress region 317 from the first major surface 215 and the second depth of compression 325 of the second compressive stress region 319 from the first surface portion of the second major surface 216 may be larger relative to that produced by a shorter exposure time, for a given bath temperature and composition. In contrast, when the glass-based article 301 is exposed to the strengthening bath 311 for a shorter period of time (e.g., closer to 6 hours, for example), the first depth of compression 323 of the first compressive stress region 317 from the first major surface 215 and the second depth of compression 325 of the second compressive stress region 319 from the first surface portion of the second major surface 216 may be smaller relative to that produced by a longer exposure time, for a given bath temperature and composition.

Following the formation of the first compressive stress region 317, the second compressive stress region 319, and the third compressive stress region 320, the glass-based article 301 may be removed from the strengthening bath 311. In some embodiments, as shown in FIG. 2, the glass-based article 301 may experience a bending moment that can cause the glass-based article 301 to deform. For example, the bending moment may be due, in part, to the glass-based article 301 comprising an asymmetrical shape, in which the first major surface 215 comprises a smaller surface area than the second major surface 216 (e.g., due at least in part to the second dimension 315 being larger than the first dimension 313, as illustrated in FIG. 1). Forming the compressive stress regions 317, 319, 320 can comprise replacing smaller alkali ions with larger ions from the strengthening bath 311. A stress imbalance may be generated between the first major surface 215 and the second major surface 216 from the formation of the compressive stress regions. In some embodiments, this stress imbalance can lead to a bending moment within the glass-based article 301, which can cause the glass-based article 301 to deform. For example, the glass-based article 301 may initially be substantially planar prior to the exposure to the strengthening bath 311, wherein the glass-based article 301 may initially be in a non-compressed and non-deformed state. Following the formation of the compressive stress regions 317, 319, the glass-based article 301 can deform a distance 401 from a plane defined by an initially planar glass-based article 402. The initially planar glass-based article 402 is illustrated with dashed lines to represent a degree of deformation between the glass-based article 301 (e.g., following the formation of the compressive stress regions) and the initially planar glass-based article 402 prior to the formation of the compressive stress regions. In some embodiments, the distance 401 can be greater than a thickness of the glass-based article 301. In some embodiments, the glass-based article 301 can deform in a direction towards the smaller surface area (e.g., the first major surface 215). For example, as a result of the deformation, the first major surface 215 can comprise a concave shape facing outwardly from the first major surface 215 and the second major surface 216.

In some embodiments, if the strain state of a material is such that the non-zero strain components act in one plane, then the material may be in plane strain. Assuming that the glass-based article 301 is in plane strain, the normal compressive stresses can be calculated for the glass-based article 301, and the stresses can then be adjusted by adding a constant to ensure that an integral of these stresses is zero (e.g., as for mechanical equilibrium). Mechanical equilibrium imposes that the following equation (1) holds:

$$\int \sigma \tilde{y} dx d\tilde{y} = 0. \tag{1}$$

The resulting normal stresses may be represented with $\sigma$ while the vertical coordinate relative to a neutral line may be represented with $\tilde{y}$. Under the plain strain assumption, this condition is not satisfied such that a bending moment may exist. The bending moment can be neutralized or cancelled by a curvature (e.g., deformation, warp, etc.). For example, the glass-based article 301 may curve (e.g., deform, warp, etc.) in response to the generated bending moment following the formation of compressive stress regions. The curvature can be represented by the equation (2):

$$\kappa = \frac{\int \sigma \tilde{y} dx d\tilde{y}}{E \int \tilde{y}^{\wedge} 2 dx d\tilde{y}} \tag{2}$$

in which E represents Young's modulus. By removing materials from the second major surface 216 of the glass-based article 301, the numerator of the previous equation can be brought to zero by redistributing the stresses, which can thus bring the curvature to zero. Therefore, in some embodiments, forming recessed portions at the second major surface 216 by removing portions of the second compressive stress region 319 at the second major surface 216 can reduce the bending moment of the glass-based article 301 and, thus, reduce a curvature, deformation, warp, etc.

In some embodiments, the edge 307 of the glass-based article 301 can comprise a first edge 403, a second edge 405, a third edge 407, and a fourth edge 409. In some embodiments, the first edge 403 and the third edge 407 can comprise opposed portions of the edge 307 located on opposing sides of the glass-based article 301, while the second edge 405 and the fourth edge 409 can also comprise opposed portions of the edge 307 located on opposing sides of the glass-based article 301. For example, the second edge 405 can extend between the first edge 403 and the third edge 407 at one end of the glass-based article 301, while the fourth edge 409 can extend between the first edge 403 and the third edge 407 at an opposite end of the glass-based article 301. In some embodiments, the first edge 403 and the third edge 407 can comprise a larger dimension than the second edge 405 or the fourth edge 409. For example, a dimension of the first edge 403 (e.g., as measured between the second edge 405 and the fourth edge 409) or the third edge 407 (e.g., as measured between the second edge 405 and the fourth edge 409) may be larger than a dimension of the second edge 405 (e.g., as measured between the first edge 403 and the third edge 407) or the fourth edge 409 (e.g., as measured between the first edge 403 and the third edge 407). In some embodiments, the distance between the first edge 403 and the third edge 407 can comprise a length of the glass-based article 301, while the distance between the second edge 405 and the fourth edge 409 can comprise a width of the glass-based article 301, wherein the length of the glass-based article 301 may be larger than the width of the glass-based article 301. In some embodiments, due to the first edge 403 and the third edge 407 being longer than the second edge 405 and the fourth edge 409, a more pronounced degree of warp may be present along the first edge 403 and the third edge 407. For example, the glass-based article 301 may experience the bending moment along the first edge 403 and the third edge 407, which may cause the distance 401 of the deformation. The glass-based article 301 in FIG. 2 can deform the distance 401 along the longer edges (e.g., the first edge 403 and the third edge 407) in the y-axis. The deformation of the distance 401 may be due, in part, to the asymmetrical shape of the glass-based article 301, wherein a stress imbalance is generated between the first major surface 215 and the second major surface 216 due to the formation of the compressive stress regions. This stress imbalance can cause the bending moment, which can cause the glass-based article 301 to deform the distance 401. In some embodiments, the distance 401 can be greater when the stress imbalance is greater. In some embodiments, the shorter edges of the glass-based article 301 (e.g., the second edge 405 and the fourth edge 409) may also experience warp, for example, causing the glass-based article 301 to deform along the x-axis (e.g., along the second edge 405 and the fourth edge 409) in addition to deforming along the y-axis. In some embodiments, the glass-based article may be non-planar along the y-axis and/or along the x-axis.

FIG. 3 illustrates a sectional view of the glass-based article 301 along line 5-5 of FIG. 2. In some embodiments, methods of manufacturing the glass-based article 301 can comprise reducing the bending moment of the glass-based article 301 by removing one or more edge portions 501 of the second compressive stress region 319 at the second major surface 216. For example, the bending moment of the glass-based article 301 may be caused by the asymmetry of the first major surface 215 relative to the second major surface 216. Along with the asymmetry, the formation of the compressive stress regions 317, 319, 320 by replacing smaller ions with larger ions can cause the second major surface 216 to expand to a greater degree than does the first major surface 215. This expansion can cause the deformation of the glass-based article 301 illustrated in FIGS. 3 and 4 due, in part, to the glass-based article 301 maintaining stress equilibrium. Removing the one or more edge portions 501 of the second compressive stress region 319 at the second major surface 216 can reduce the surface area, and, thus, expansion, at the second major surface 216, which can reduce the bending moment of the glass-based article 301.

To remove the one or more edge portions 501 of the second compressive stress region 319, in some embodiments, a mask 503 can be positioned to cover one or more of the surfaces of the glass-based article 301. In some embodiments, the mask 503 can cover the first major surface 215, a portion of the second major surface 216, the beveled edge surface 305, and the outer surface of the edge 307, for example, the first edge 403 and the third edge 407 illustrated in FIG. 3, and also the second edge 405 and the fourth edge 409 (see, also, FIG. 2). In some embodiments, one or more unmasked areas may be defined adjacent to the mask 503 that covers a portion of the second major surface 216. For example, a first edge portion 507 can be defined adjacent to the mask 503 (e.g., between the mask 503 and the first edge 403) and may be unmasked. A second edge portion 509 can be defined adjacent to the mask 503 (e.g., between the mask 503 and the third edge 407) and may be unmasked. In some embodiments, the mask 503 can be positioned to cover a central portion 511 of the second major surface 216 between the first edge portion 507 and the second edge portion 509. In some embodiments, the mask 503 can extend along the x-axis between the first edge portion 507 and the second edge portion 509, and along the y-axis (see, also, FIG. 2) between the second edge 405 and the fourth edge 409. In some embodiments, the first edge portion 507 and the second edge portion 509 may be unmasked and may extend along a length of the glass-based article 301 between the second edge 405 and the fourth edge 409.

In some embodiments, the mask 503 can be applied to the glass-based article 301 in several ways, for example, by lamination, screen printing, spin coating, etc. The mask 503 can comprise a material that may be resistant to an etchant 513 to which the glass-based article 301 may be exposed. For example, the mask 503 can comprise one or more of a Vitayon HF resistant ink or other etch resistant type inks, a photolithography resist (e.g., AZP4620, etc.), a polystyrene material with a silane modification, or a laminated film, etc. By masking the central portion 511 of the second major surface 216, the first major surface 215, the beveled edge surface 305, and the edges 403, 405, 407, 409, the first edge portion 507 and the second edge portion 509 may be exposed to the etchant 513 while the central portion 511 of the second major surface 216, the first major surface 215, the beveled edge surface 305, and the edges 403, 405, 407, 409 may be shielded from and not exposed to the etchant 513. In some embodiments, methods of manufacturing the glass-based article 301 can comprise etching the second major surface 216 to remove the one or more edge portions 501 of the second compressive stress region 319 at the second major surface 216. For example, to etch the second major surface 216, the first edge portion 507 and the second edge portion 509 can be exposed to the etchant 513 and may be etched. Due to the central portion 511 of the second major surface 216, the first major surface 215, the beveled edge surface 305, and the edges 403, 405, 407, 409 being masked (e.g., by the mask 503), the central portion 511 of the second major surface 216, the first major surface 215, the beveled edge surface 305, and the edges 403, 405, 407, 409 may not be etched. In some embodiments, the mask 503 can remain on the central portion 511 of the second major surface 216, the first major surface 215, the beveled edge surface 305, and the edges 403, 405, 407, 409 during the etching. In some embodiments, the etchant 513 can comprise one or more of from about 0% to about 50% HF, a combination of HF and $HNO_3$, $H_2SO_4$, etc.

Figure 4:
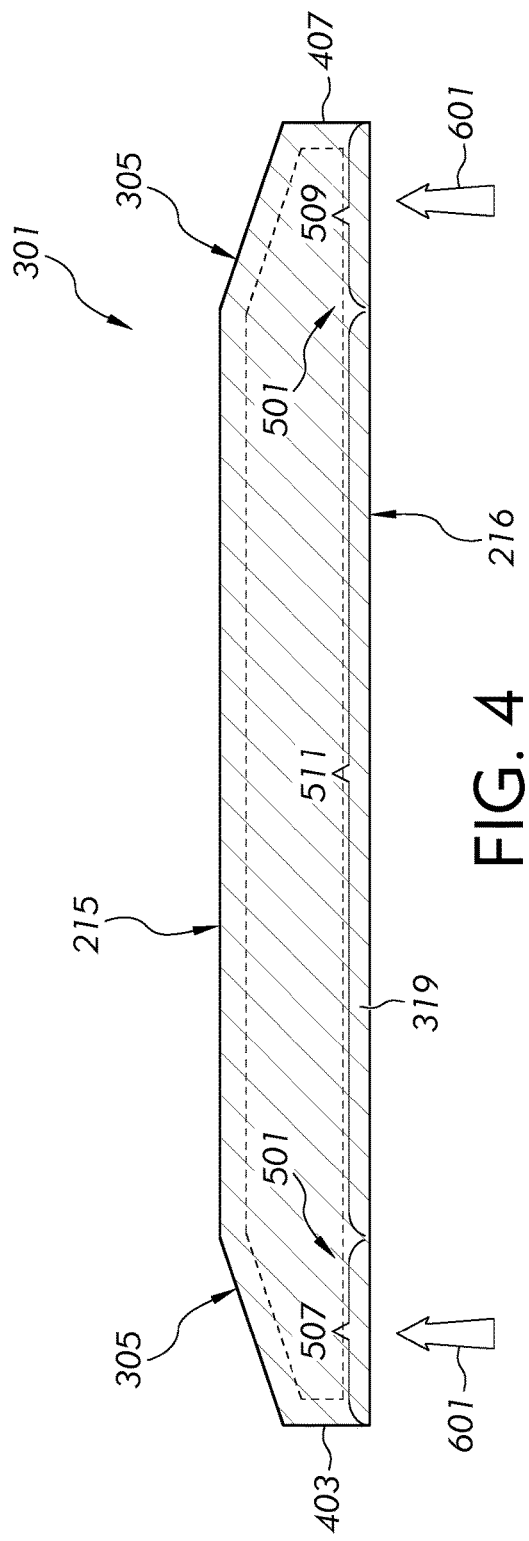
FIG. 4 illustrates a sectional view of example embodiments of the glass-based article with one or more edge portions being removed by mechanical grinding in accordance with embodiments of the disclosure.

Referring to FIG. 4, in some embodiments, the glass-based article 301 may not be limited to manufacture by etching to remove the one or more edge portions 501 of the second major surface 216. For example, in some embodiments as an alternative or in addition to etching, methods of manufacturing the glass-based article 301 can comprise reducing a bending moment of the glass-based article 301 by removing one or more edge portions 501 of the second compressive stress region 319 at the second major surface 216 by grinding the second major surface 216. To grind the one or more edge portions 501, the glass-based article 301 may not be covered by the mask 503. Rather, in some embodiments, a grinding wheel (schematically illustrated by arrows 601) can grind the first edge portion 507 and the second edge portion 509, while not grinding the remainder of the glass-based article 301; for example, without grinding the central portion 511 of the second major surface 216, the first major surface 215, the beveled edge surface 305, and the edge 307. Therefore, reducing the bending moment can comprise grinding the second major surface 216 to remove the one or more edge portions 501 of the second compressive stress region 319 at the second major surface 216. In some embodiments, material from the one or more edge portions 501 can be removed by polishing (e.g., brush polishing) while remaining portions of the glass-based article 301 may be masked.

Figure 5:
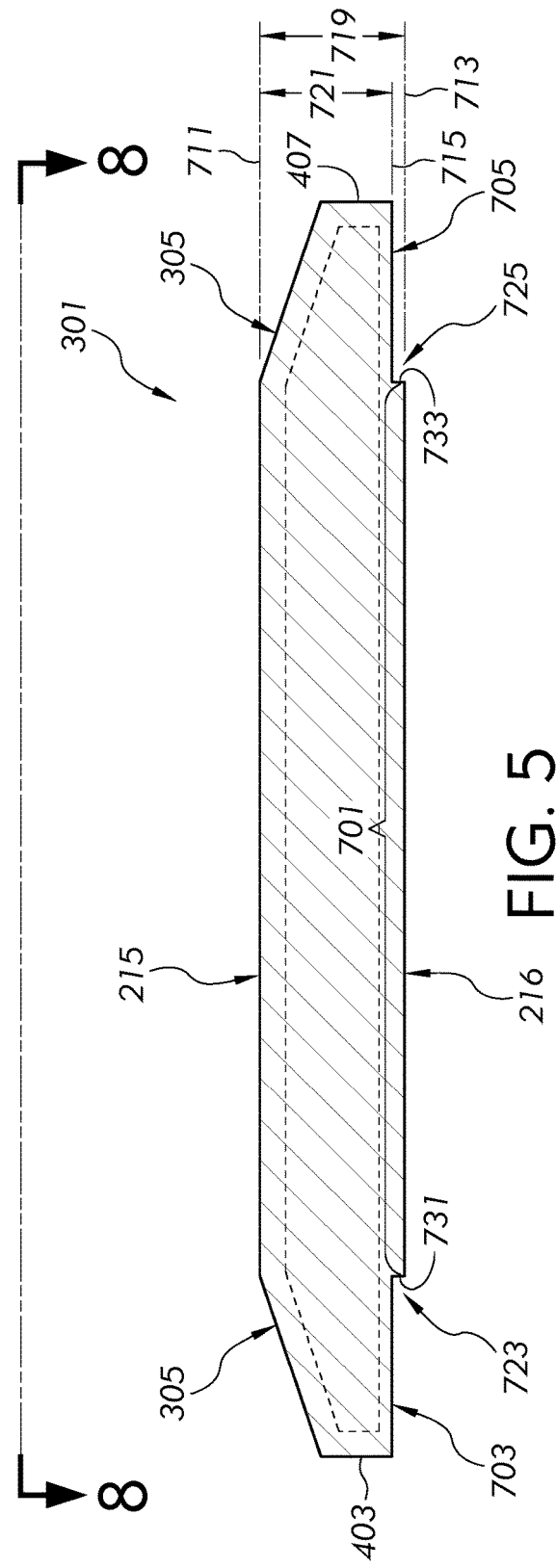
FIG. 5 illustrates a sectional view of example embodiments of the glass-based article following the removal of one or more edge portions in accordance with embodiments of the disclosure.

Referring to FIG. 5, following the removal of the first edge portion 507 and the second edge portion 509, the mask 503 can be removed. In some embodiments (e.g., as illustrated in FIG. 4), when the first edge portion 507 and the second edge portion 509 are removed by mechanical grinding as opposed to etching, the expense associated with application of and/or removal of a mask may be avoided. The mask 503 can be removed in several ways, for example, by rinsing the mask 503 from the glass-based article 301. In some embodiments, a pressurized liquid can be directed at a sufficient velocity to cause the mask 503 to be removed from the central portion 511 of the second major surface 216, the first major surface 215, the beveled edge 303, and the beveled edge surface 305. Once the mask 503 has been removed, the surfaces of the glass-based article 301 can be exposed.

In some embodiments, the second major surface 216 can comprise a first surface portion 701 and one or more edge surface portions 703, 705 recessed from the first surface portion 701. For example, the one or more edge surface portions 703, 705 can comprise a first edge surface portion 703 recessed from the first surface portion 701 and a second edge surface portion 705 recessed from the first surface portion 701. In some embodiments, following the removal of the first edge portion 507 (e.g., by etching in FIG. 3 or grinding or brushing in FIG. 4), the first edge surface portion 703 can remain and can represent the boundary at which the etching or grinding stopped. Following the removal of the second edge portion 509 (e.g., by etching in FIG. 3 or grinding in FIG. 4), the second edge surface portion 705 can remain and can represent the boundary at which the etching or grinding stopped. By being recessed, the first edge surface portion 703 and the second edge surface portion 705 may not extend within the same plane as the first surface portion 701, and in closer proximity to the first major surface 215. For example, the first major surface 215 can extend within a first plane 711. In some embodiments, the second major surface 216, in particular, the first surface portion 701 of the second major surface 216, can extend within a second plane 713 that may be substantially parallel to the first plane 711.

In some embodiments, the first edge surface portion 703, the second edge surface portion 705, or the first edge surface portion 703 and the second edge surface portion 705 can extend within a third plane 715 that may be substantially parallel to the second plane 713 and positioned between the first plane 711 and the second plane 713. The second plane 713 can be spaced a first distance 719 from the first plane 711. The third plane 715 can be spaced a second distance 721 from the first plane 711. In some embodiments, due to the first edge surface portion 703 and the second edge surface portion 705 being recessed from the first surface portion 701, the first distance 719 may be greater than the second distance 721; for example, with the first surface portion 701 spaced farther away from the first major surface 215 than the first edge surface portion 703 or the second edge surface portion 705 are spaced from the first major surface 215. As shown, in some embodiments, the third plane 715 can be located closer to the second plane 713 than the first plane 711. The first edge surface portion 703 and/or the second edge surface portion 705 are not limited to extending along the third plane 715 that may be substantially parallel to the second plane 713. For example, in some embodiments, one or more of the edge surface portions (e.g., first edge surface portion 703, the second edge surface portion 705, etc.) can be angled relative to the first plane 711 and the second plane 715. For example, the one or more of the edge surface portions, for example, the first edge surface portion 703, the second edge surface portion 705, etc., can form an angle that may be within a range from about 0 degrees to about 180 degrees relative to the first plane 711 and/or the second plane 715. In some embodiments, the one or more of the edge surface portions for example, the first edge surface portion 703, the second edge surface portion 705, etc., can extend from the first surface portion 701 to an edge 403, 407 of the glass-based article 301 such that a first sidewall 731 and/or a second sidewall 733 may not be present (e.g., with a step height of the first sidewall 731 at the intersection of the first surface portion 701 and the first edge surface portion 703 or of the second sidewall 733 at the intersection of the first surface portion 701 and the second edge surface portion 705 being zero).

In some embodiments, the first edge surface portion 703 and the second edge surface portion 705 are not limited to extending along the third plane 715. Rather, in some embodiments, the first edge surface portion 703 and the second edge surface portion 705 are not limited to extending co-planar to one another but can extend within separate and distinct planes. For example, the first edge surface portion 703 can extend within the third plane 715 while the second edge surface portion 705 can extend within a fourth plane that may be positioned between the second plane 713 and the third plane 715. The first edge surface portion 703 and the second edge surface portion 705 are not limited to comprising a planar shape, but, in some embodiments, one or more of the first edge surface portion 703 or the second edge surface portion 705 can comprise a non-planar shape, for example, a curved surface (e.g., a concave surface, a convex surface, an undulating surface, etc.) Despite comprising a non-planar shape, the first edge surface portion 703 and the second edge surface portion 705 can be recessed from the first surface portion 701 as discussed above. In some embodiments, the first edge surface portion 703 can extend along a first side 723 of the first surface portion 701 while the second edge surface portion 705 can extend along a second side 725 of the first surface portion 701. For example, the first surface portion 701 can be positioned between the first edge surface portion 703 and the second edge surface portion 705. In some embodiments, the first sidewall 731 can extend between the first edge surface portion 703 and the first surface portion 701, while the second sidewall 733 can extend between the second edge surface portion 705 and the first surface portion 701. The first sidewall 731 can extend substantially parallel to the second sidewall 733, with the first sidewall 731 located on the first side 723 of the first surface portion 701 and the second sidewall 733 located on the second side 725 of the first surface portion 701. In some embodiments, the glass-based article 301 may not comprise the first sidewall 731 and/or the second sidewall 733, but, rather, the glass-based article 301 may comprise a gradual change from the second major surface 216 to the first edge surface portion 703 and the second edge surface portion 705. In some embodiments, the first edge surface portion 703 and the first sidewall 731 can form an angle that is within a range from about 80 degrees to about 100 degrees, while the second edge surface portion 705 and the second sidewall 733 can form an angle that is within a range from about 80 degrees to about 100 degrees. In some embodiments, the first edge surface portion 703 and the second edge surface portion 705 are not limited to forming a right angle relative to the first sidewall 731 and the second sidewall 733. For example, in some embodiments, an intersection between the first surface portion 701 and one or more of the first edge surface portion 703 and the second edge surface portion 705 may be rounded. For example, the first sidewall 731 and the first edge surface portion 703 can form a substantially rounded shape at the intersection between the first surface portion 701 and an inner end of the first edge surface portion 703. In some embodiments, the second sidewall 733 and the second edge surface portion 705 can form a substantially rounded shape at the intersection between the first surface portion 701 and an inner end of the second edge surface portion 705.

Figure 6:
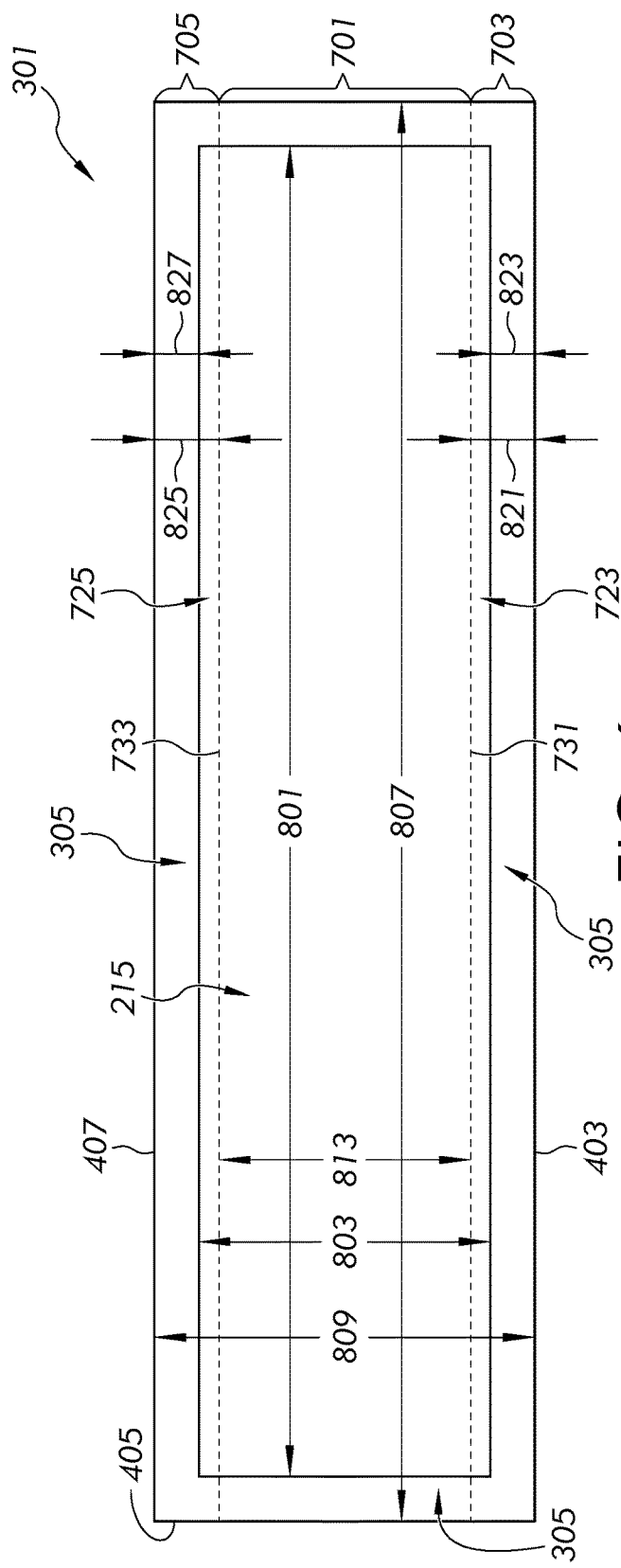
FIG. 6 illustrates a top view of example embodiments of the glass-based article along line 8-8 of FIG. 5 in accordance with embodiments of the disclosure.

FIG. 6 illustrates a top view of the glass-based article 301 along line 8-8 of FIG. 5 following the formation of the first edge surface portion 703 and the second edge surface portion 705. It will be appreciated that the first sidewall 731 bordering the first edge surface portion 703 and the second sidewall 733 bordering the second edge surface portion 705 are illustrated with dashed lines in FIG. 6, due to the second major surface 216 being obstructed from view (e.g., by being located at a bottom of the glass-based article 301) along line 8-8 in FIG. 5. In some embodiments, the first major surface 215 can comprise a first length 801 and a first width 803 perpendicular to the first length 801. For example, the first length 801 may be less than a total length (e.g., equivalent to a second length 807) of the glass-based article 301 (e.g., between the second edge 405 and the fourth edge 409) due to the beveled edge surface 305 extending between the first major surface 215 and the second edge 405, and between the first major surface 215 and the fourth edge 409. In some embodiments, the first width 803 may be less than a total width (e.g., equivalent to a second width 809) of the glass-based article 301 due to the beveled edge surface 305 extending between the first major surface 215 and the first edge 403, and between the first major surface 215 and the third edge 407.

In some embodiments, the second major surface 216 (e.g., located at a bottom of the glass-based article 301) may comprise the second length 807 that may be greater than the first length 801. The first edge surface portion 703 can extend along the second length 807 on the first side 723 of the first surface portion 701. The second edge surface portion 705 can extend along the second length 807 on the second side 725 of the first surface portion 701. The second major surface 216 can comprise a second width 809, perpendicular to the second length 807, that may be greater than the first width 803. In some embodiments, the first surface portion 701 can comprise a third width 813 between the first edge surface portion 703 and the second edge surface portion 705. The third width 813, which may extend in the same direction as the first width 803 and the second width 809 (e.g., equivalent to a total width of the glass-based article 301), may be less than the first width 803 and/or the second width 809. Depending on the bending moment and the distance 401 (e.g., illustrated in FIG. 2) that the glass-based article 301 deforms, the first edge surface portion 703 and the second edge surface portion 705 can comprise a larger or smaller size than as illustrated to reduce for example eliminate the distance 401. For example, the first edge surface portion 703 can extend inward in the direction of the second width 809 by a first distance 821 from the first edge 403. A portion of the beveled edge surface 305 can extend inward in the direction of the second width 809 by a second distance 823 from the first edge 403. In some embodiments, the first distance 821 may be greater than the second distance 823 (e.g., as illustrated in FIG. 6), though, in some embodiments, the first distance 821 may be less than or equal to the second distance 823. The second edge surface portion 705 can extend inward in the direction of the second width 809 by a third distance 825 from the third edge 407. A portion of the beveled edge surface 305 can extend inward in the direction of the second width 809 by a fourth distance 827. In some embodiments, the third distance 825 may be greater than the fourth distance 827 (e.g., as illustrated in FIG. 6), though, in some embodiments, the third distance 825 may be less than or equal to the fourth distance 827. In some embodiments, for larger bending moments in which the distance 401 (e.g., illustrated in FIG. 2) that the glass-based article 301 deforms is larger, one or more of the first distance 821 may be larger than the second distance 823 or the third distance 825 may be larger than the fourth distance 827. In some embodiments, for smaller bending moments in which the distance 401 (e.g., illustrated in FIG. 2) that the glass-based article 301 deforms is smaller, one or more of the first distance 821 may be smaller than the second distance 823 or the third distance 825 may be smaller than the fourth distance 827.

Figure 7:
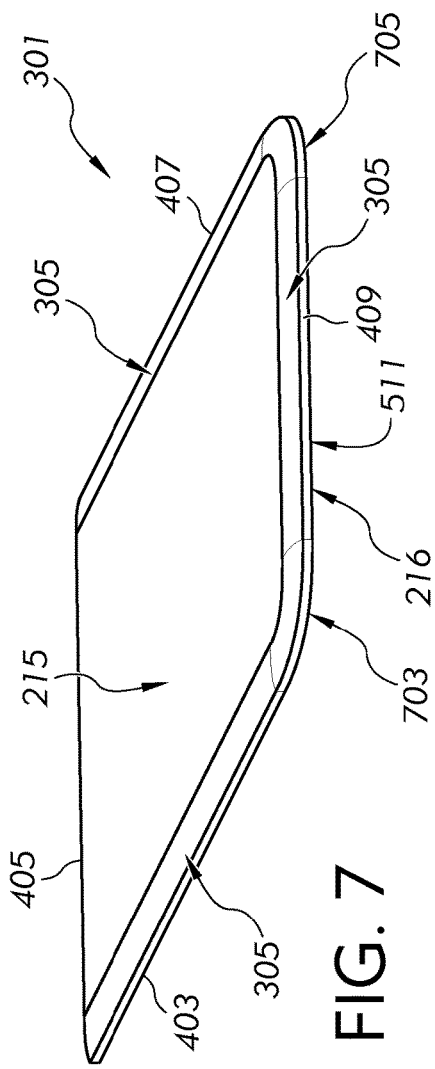
FIG. 7 illustrates a perspective view of example embodiments of a glass-based article after a bending moment has been reduced in accordance with embodiments of the disclosure.
Figure 10:
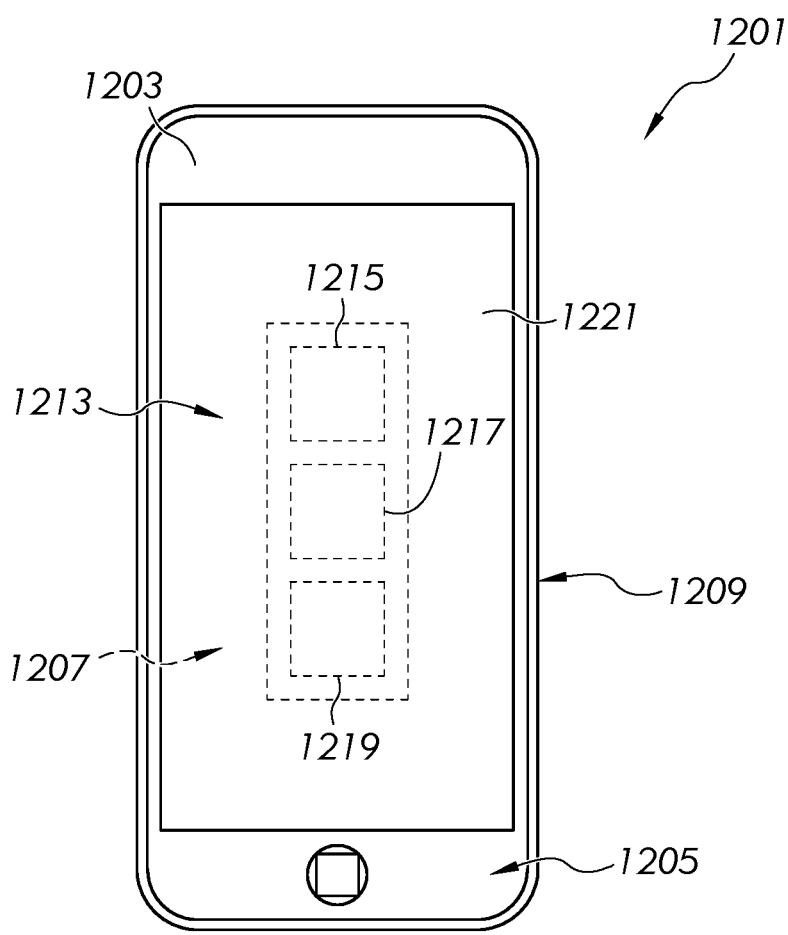
FIG. 10 illustrates a plan view of an exemplary electronic device incorporating any of the glass-based articles disclosed herein.
Figure 11:
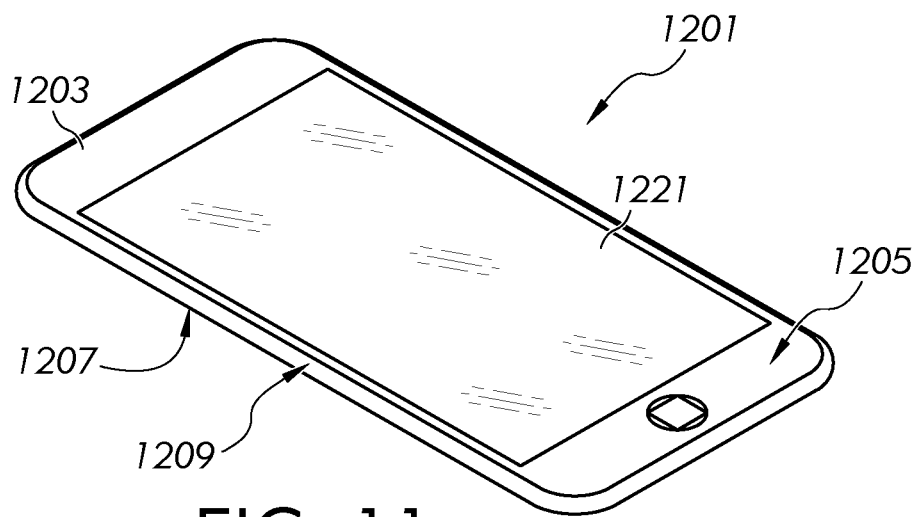
FIG. 11 illustrates a perspective view of the exemplary electronic device of FIG. 10.

Referring to FIG. 7, a perspective view of the glass-based article 301 is illustrated following the removal of the first edge portion 507 and the second edge portion 509 (e.g., illustrated in FIGS. 5-6) to form the first edge surface portion 703 and the second edge surface portion 705. In some embodiments, the reducing the bending moment can comprise reducing, for example, neutralizing the bending moment. For example, the removal of the first edge portion 507 and the second edge portion 509 of the second compressive stress region 319 from the second major surface 216 that forms the first edge surface portion 703 and the second edge surface portion 705 can reduce the bending moment for example neutralize the bending moment, and the glass-based article 301 can return to a planar shape, wherein a displacement distance 401 may be reduced and even be zero. The bending moment can therefore be reduced, for example, neutralized by removing a large enough portion of the second compressive stress region 319 of the second major surface 216 to cause the second major surface 215 of the glass-based article 301 to approximate or achieve a planar shape.

FIG. 8 illustrates a bottom view of the glass-based article along line 10-10 of FIG. 2 following the formation of the compressive stress regions 317, 319, 320 (e.g., illustrated in FIG. 1). In some embodiments, the glass-based article 301 may not be limited to comprising two recessed portions extending along opposing sides (e.g., extending along the first edge 403 and the third edge 407). Rather, in some embodiments, the glass-based article 301 may experience a bending moment and, thus, deformation, along not only the first edge 403 and the third edge 407, but also the second edge 405 and the fourth edge 409. For example, the first edge 403 and the third edge 407 may be non-planar, while the second edge 405 and the fourth edge 409 may also be non-planar. For example, one or more of the first edge 403, the second edge 405, the third edge 407, or the fourth edge 409 may comprise a curved shape (e.g., concave shape or convex shape). In some embodiments, to reduce the bending moment and deformation along the first edge 403, the second edge 405, the third edge 407, and the fourth edge 409, portions of the second major surface 216 can be removed along the first edge 403, the second edge 405, the third edge 407, and the fourth edge 409.

In some embodiments, a mask 1001 can be formed in a similar manner as the mask 503 (e.g., illustrated in FIG. 3) is formed. To reduce the bending moment along the x-axis and the y-axis, the mask 1001 may be spaced a distance inward from the first edge 403, the second edge 405, the third edge 407, and the fourth edge 409. For example, the mask 1001 can be spaced the first distance 821 from the first edge 403 and the third distance 825 from the third edge 407. In some embodiments, the mask 1001 can be spaced a third distance 1003 from the second edge 405 and a fourth distance 1005 from the fourth edge 409. In some embodiments, the second major surface 216 can comprise the first edge portion 507, the second edge portion 509, a third edge portion 1009, and a fourth edge portion 1011. The first edge portion 507 can extend along the first edge 403 and may be unmasked (e.g., not covered by the mask 1001). The second edge portion 509 can extend along the third edge 407 and may be unmasked (e.g., not covered by the mask 1001). The third edge portion 1009 can extend along the second edge 405 and may be unmasked (e.g., not covered by the mask 1001). The fourth edge portion 1011 can extend along the fourth edge 409 and may be unmasked (e.g., not covered by the mask 1001). The mask 1001 can be applied to the glass-based article 301 in several ways, for example, by lamination, screen printing, spin-coating etc. The mask 1001 can comprise a material that may be resistant to an etchant to which the glass-based article 301 may be exposed. For example, the mask 1001 can comprise one or more of a Vitayon HF resistant ink or other etch resistant type inks, a photolithography resist (e.g., AZP4620, etc.), a polystyrene material with a silane modification, or a laminated film, etc.

In some embodiments, following the application of the mask 1001 to the second major surface 216, the glass-based article 301 can be exposed to an etchant (e.g., similar to the etchant 513 illustrated in FIG. 3). The etchant can etch the exposed portions of the second major surface 216, for example, the first edge portion 507, the second edge portion 509, the third edge portion 1009, and the fourth edge portion 1011. In some embodiments, the etchant can remove the first edge portion 507, the second edge portion 509, the third edge portion 1009, and the fourth edge portion 1011 to form one or more edge surface portions that may be recessed from a central surface portion of the second major surface 216. In some embodiments, the glass-based article 301 may not be limited to etching to remove the edge portions 507, 509, 1009, 1011 of the second major surface 216. For example, similar to FIG. 4, as an alternative or in addition to etching, in some embodiments, manufacturing the glass-based article 301 can comprise reducing the bending moment of the glass-based article 301 by removing one or more edge portions 507, 509, 1009, 1011 of the second major surface 216 by grinding the second major surface 216. To grind the one or more edge portions 507, 509, 1009, 1011, the glass-based article 301 may not be covered by the mask 1001. Rather, in some embodiments, a grinding wheel (e.g., similar to grinding wheel of FIG. 4 discussed above) can grind the first edge portion 507, the second edge portion 509, the third edge portion 1009, and the fourth edge portion 1011 while not grinding the remainder of the glass-based article 301, for example, a central portion of the second major surface 216.

FIG. 9 illustrates the glass-based article following the removal of the mask 1001. In some embodiments, following the removal of the first edge portion 507, the second edge portion 509, the third edge portion 1009, and the fourth edge portion 1011, the mask 1001 can be removed, for example, by rinsing the mask 1001 from the glass-based article 301. Once the mask 1001 has been removed, the surfaces of the glass-based article 301 can be exposed. In some embodiments, when the first edge portion 507, the second edge portion 509, the third edge portion 1009, and the fourth edge portion 1011 are removed by mechanical grinding and not etching, a mask may not be applied and removed. In some embodiments, the second major surface 216 can comprise the first surface portion 701 and one or more edge surface portions recessed from the first surface portion 701. For example, the one or more edge surface portions can comprise the first edge surface portion 703, the second edge surface portion 705, a third edge surface portion 1101, and a fourth edge surface portion 1103. The third edge surface portion 1101 can extend along the second edge 405 while the fourth edge surface portion 1103 can extend along the fourth edge 409. In some embodiments, a perimeter of the second major surface 216 can be recessed, with the first edge surface portion 703, the second edge surface portion 705, the third edge surface portion 1101, and the fourth edge surface portion 1103 extending around and recessed from the first surface portion 701, which may be located inwardly from the edges 403, 405, 407, 409 of the glass-based article 301. It will be appreciated that the glass-based article 301 may not be limited to comprising recessed portions that extend along opposing sides of the second major surface 216 (e.g., as illustrated in FIGS. 8-9) or recessed portions that extend about a perimeter of the second major surface 216 (e.g., as illustrated in FIG. 9). Rather, in some embodiments, some or all portions of the second major surface 216 can be recessed to reduce and/or neutralize the bending moment of the glass-based article 301 generated from exposure to the strengthening bath 311.

The glass-based article 301 disclosed herein may be incorporated into another article for example an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of glass-based articles 301 disclosed herein is illustrated in FIGS. 12-13. For example, FIGS. 12-13 illustrate a consumer electronic product 1201 comprising a housing 1203. The housing 1203 can comprise a front surface 1205, a back surface 1207, and side surfaces 1209. In some embodiments, the consumer electronic product 1201 can comprise one or more electrical components 1213 within the housing 1203 (e.g., at least partially inside or entirely within the housing 1203). The one or more electrical components 1213 can comprise a controller 1215, a memory 1217, and a display 1219. In some embodiments, the display 1219 may be at or adjacent to the front surface 1205 of the housing 1203. The consumer electronic product 1201 can comprise a cover substrate 1221 at or over the front surface 1205 of the housing 1203, for example, with the cover substrate 1221 over the display 1219. In some embodiments, the cover substrate 1221 may comprise the glass-based article 301 disclosed herein. In some embodiments, at least one of a portion of the housing 1203 or the cover substrate 1221 comprises the glass-based article 301.

As disclosed herein, forming compressive stress regions in the glass-based article 301 comprising the first major surface 215 that may be asymmetrical relative to the second major surface 216 can generate a bending moment in the glass-based article 301. This bending moment can cause the glass-based article 301 to deform. The bending moment can be reduced to avoid deformation in several ways, depending on the degree to which the glass-based article 301 has deformed. For example, portions of the second major surface 216 can be removed, which can reduce the compressive stress at the second major surface 216 and reduce the bending moment. In some embodiments, the first edge portion 507 and the second edge portion 509 (e.g., illustrated in FIG. 3) can be removed from the second major surface 216 to form the first edge surface portion 703, which may be recessed from the first surface portion 701 of the second major surface 216, and the second edge surface portion 705, which may be recessed from the first surface portion 701. The first edge surface portion 703 and the second edge surface portion 705 can extend along opposing edges of the glass-based article 301, for example, the first edge 403 and the third edge 407. In some embodiments, to further reduce the bending moment, additional portions of the second major surface 216 can be removed to form the third edge surface portion 1101 and the fourth edge surface portion 1103, wherein the third edge surface portion 1101 and the fourth edge surface portion 1103 may be recessed from the first surface portion 701 of the second major surface 216. The first edge surface portion 703, the second edge surface portion 705, the third edge surface portion 1101, and the fourth edge surface portion 1103 can extend about a perimeter of the glass-based article 301 and may be recessed from the first surface portion 701. Forming recessed surface portions at the second major surface 216 can reduce the compressive stress at the second major surface 216, which can cause a reduction in the bending moment. In some embodiments, the bending moment can be neutralized, such that the glass-based article 301 can return to a non-deformed, or planar, shape.

As used herein the terms "the," "a," or "an," mean "one or more," and should not be limited to "only one" unless explicitly indicated to the contrary. Thus, for example, reference to "a component" includes embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including," and variations thereof shall be construed as synonymous and open-ended, unless otherwise indicated.

It should be understood that while various embodiments have been described in detail relative to certain illustrative and specific embodiments thereof, the present disclosure should not be considered limited to such, as numerous modifications and combinations of the disclosed features are envisioned without departing from the scope of the following claims.

What is claimed is:

1. A glass-based article comprising:
   a first major surface comprising a first length and a first width perpendicular to the first length;
   a first compressive stress region extending to a first depth of compression from the first major surface;
   a second major surface parallel to the first major surface, the second major surface comprising a second length greater than the first length, and a second width, perpendicular to the second length, greater than the first width, the second major surface comprising a first surface portion, a first edge surface portion recessed from the first surface portion, and a second edge surface portion recessed from the first surface portion, the first edge surface portion extending along the second length on a first side of the first surface portion, the second edge surface portion extending along the second length on a second side of the first surface portion, wherein the first major surface extends within a first plane, the first surface portion extends within a second plane, and the first edge surface portion extends within a third plane that is substantially parallel to the second plane and positioned between the first plane and the second plane; and
   a second compressive stress region extending to a second depth of compression from the first surface portion wherein the second depth of compression at the first surface portion is greater than a depth of compression at the first edge surface portion.

2. The glass-based article of claim 1, wherein the second surface comprises a third edge surface portion recessed from the first surface portion and a fourth edge surface portion recessed from the first surface portion, the third edge surface portion extending along the second width on a third side of the first surface portion, the fourth edge surface portion extending along the second width on a fourth side of the first surface portion.

3. The glass-based article of claim 1, wherein the second edge surface portion extends within the third plane.

4. The glass-based article of claim 1, wherein the first edge surface portion is angled relative to the first plane and the second plane, the first edge surface portion extending from the first surface portion to an edge of the glass-based article.

5. The glass-based article of claim 1, wherein an intersection between the first surface portion and one or more of the first edge surface portion or the second edge surface portion is rounded.

6. A glass-based article comprising:
a first major surface comprising a first length and a first width perpendicular to the first length;
a first compressive stress region extending to a first depth of compression from the first major surface;
a second major surface parallel to the first major surface, the second major surface comprising a second length greater than the first length, the second length a maximum length of the glass-based article, and a second width, perpendicular to the second length, greater than the first width, the second major surface comprising a first surface portion, a first edge surface portion recessed from the first surface portion, and a second edge surface portion recessed from the first surface portion, the first edge surface portion extending along the second length on a first side of the first surface portion, the second edge surface portion extending along the second length on a second side of the first surface portion, wherein the first major surface extends within a first plane, the first surface portion extends within a second plane, and the first edge surface portion is substantially planar and lying within a plane that is angled relative to the first plane and the second plane, the first edge surface portion extending from the first surface portion to an edge of the glass-based article, the first edge surface portion extending linearly along an axis along the second length; and a second compressive stress region extending to a second depth of compression from the first surface portion;
wherein the second depth of compression at the first surface portion is greater than a depth of compression at the first edge surface portion.

7. The glass-based article of claim 6, wherein the first major surface comprises a beveled edge surface extending inward in a direction of the second width by a second distance, and the first edge surface portion extends inward in the direction of the second width by a first distance, wherein the first distance is greater than the second distance.

8. The glass-based article of claim 7, wherein the beveled edge surface is substantially planar.

9. The glass-based article of claim 6, wherein the second surface comprises a third edge surface portion recessed from the first surface portion and a fourth edge surface portion recessed from the first surface portion, the third edge surface portion extending along the second width on a third side of the first surface portion, the fourth edge surface portion extending along the second width on a fourth side of the first surface portion such that the first surface portion is surrounded by the first edge surface portion, the second edge surface portion, the third edge surface portion, and the fourth edge surface portion.

\* \* \* \* \*